United States Patent [19]

Scanlon et al.

[11] 4,455,519

[45] Jun. 19, 1984

[54] TORQUE RECEIVER CONTROLLER

[76] Inventors: Thomas J. Scanlon; Gerald P. Scanlon, both of 299 Union St., Randolph, Mass. 02368

[21] Appl. No.: 306,083

[22] Filed: Sep. 28, 1981

[51] Int. Cl.³ .............................................. G05B 1/06
[52] U.S. Cl. ..................................... 318/654; 318/689
[58] Field of Search ................................ 318/654, 689

[56] References Cited

U.S. PATENT DOCUMENTS

| 3,051,882 | 8/1962 | Stoudenmire | 318/654 |
| 3,346,791 | 10/1967 | Brook | 318/689 |
| 3,403,316 | 9/1968 | Conant, Jr. | 318/689 X |
| 3,883,788 | 5/1975 | Storey, Jr. | 318/689 X |
| 3,961,212 | 6/1976 | McAdams | 318/654 X |
| 4,063,141 | 12/1977 | Levine | 318/689 X |
| 4,103,215 | 7/1978 | Naydan et al. | 318/654 |
| 4,151,452 | 4/1979 | Yonescu | 318/654 X |

Primary Examiner—B. Dobeck
Attorney, Agent, or Firm—Bromberg, Sunstein & McGregor

[57] ABSTRACT

The disclosure describes a device for continuous analog position control of multiple torque receivers by a single low power synchro signal source. The device provides continuous control of the magnitude and direction of current flow between the stators of the controlled torque receiver(s). The current flow produces torque which moves the rotor(s) to the desired position.

13 Claims, 7 Drawing Figures

ALTERNATING CURRENT PATHS AT 0° NULL

FIGURE 1
HOOKUP OF CX CONTROL SOURCE AND SLAVED
TORQUE RECEIVER TO INVENTION

FIGURE 2

TABLE OF ANGLES VS STATOR VOLTAGES (REFERRED
TO WYE JUNCTION) OF 90 VOLT LINE-TO-LINE SYNCHROS.

| θ | S1 | S2 | S3 | θ | S1 | S2 | S3 |
|---|---|---|---|---|---|---|---|
| 0 | −26 | +52 | −26 | 180 | +26 | −52 | +26 |
| 15 | −37 | +50 | −14 | 195 | +37 | −50 | +14 |
| 30 | −45 | +45 | 0 | 210 | +45 | −45 | 0 |
| 45 | −50 | +37 | +14 | 225 | +50 | −37 | −14 |
| 60 | −52 | +26 | +26 | 240 | +52 | −26 | −26 |
| 75 | −51 | +13 | +36 | 255 | +51 | −13 | −36 |
| 90 | −45 | 0 | +45 | 270 | +45 | 0 | −45 |
| 105 | −36 | −13 | +51 | 285 | +36 | +13 | −51 |
| 120 | −26 | −26 | +52 | 300 | +26 | +26 | −52 |
| 135 | −14 | −37 | +50 | 315 | +14 | +37 | −50 |
| 150 | 0 | −45 | +45 | 330 | 0 | +45 | −45 |
| 165 | +14 | −50 | +37 | 345 | −14 | +50 | −37 |

Note: (+) signifies in-phase and (−) signifies out-of-phase with TR excitation.

FIGURE 3
ALTERNATING CURRENT PATHS AT 0° NULL

FIGURE 4
RESTORING CURRENT PATHS FOR SMALL ERROR WHEN
TR ANGLE GREATER THAN 0° CONTROL ANGLE

FIGURE 5
CURRENT PATHS FOR STEP CHANGE IN CONTROL
ANGLE FROM 0° TO 90° WITH ROTOR LOCKED AT 0°

FIGURE 6
CURRENT PATHS FOR STEP CHANGE IN CONTROL
ANGLE FROM 0° TO 225° WITH ROTOR LOCKED AT 0°

FIGURE 7
CURRENT PATHS FOR STEP CHANGE IN CONTROL
ANGLE FROM 0° TO 180° (ANTI-NULL)

TORQUE RECEIVER CONTROLLER

FIELD OF THE INVENTION

This invention relates to position control of 3 phase torque motors but in particular to synchro type torque receivers. (TR). The device permits continuous position control through 360° of a plurality of TR repeaters by low power 3 wire synchro sources such as control transmitters (CX) or digital to synchro converters by utilizing the inherent self-torquing properties of the torque receiver(s). In existing TX-TR systems the invention isolates the TX stator lines from the TR enabling these lines to be used more accurately by other devices such as control transformers and synchro to digital converters.

DESCRIPTION OF THE PRIOR ART

Torque transmitters (TX) transmit angular position in 3 wire synchro form to torque receivers. When the position angles of the transmitter and receiver disagree current flows through each of the stator windings of both devices producing torque which forces the motor of the TR to assume a position substantially identical to the position angle of the transmitting synchro.

In applications where angle is provided by a low power synchro source as a control transmitter (CX), control differential (CD), digital to synchro converter, etc., or where more accurate angle data was required from the TX stator lines - an intermediate power amplification is provided by a servo followup with a control transformer (CT) input and a small motor driving a "repeater" torque transmitter (TX).

It is well known that a torque receiver is capable of self-torquing to fixed known positions by shorting stator lines and that a combination of shorting each pair (3) and reversing the phase of either the rotor excitation or the effective phase of the input signal (2) produces 6 fixed positions at 60° intervals from 0° to 300°. The introduction of digital computers which provided digital angle commands, rather than 3 wire synchro commands from torque transmitters, led to further refinement of this positioning technique to generate interim angles between the 60° sectant angles. These techniques employ sectant decoding, direction sensing logic, and control of current through the individual stators by varying the duty cycle of the switch closures. They also required a means of measuring TR present position angle, comparing present position angle with command angle, and generating appropriate switching commands. The alternative method of driving torque receivers to a digitally commanded position is by the use of digital to synchro converters which simulate torque transmitters. These are sophisticated high power devices which must deliver and absorb high peak currents to and from the TR in normal operation and must be capable of withstanding and recovering from the abnormally high peak currents encountered from false nulls and stuck rotors. Typically, these devices and their associated power supplies are bulky, heavy, and costly.

DESCRIPTION OF THE INVENTION

The invention is a 3 phase analog signal controlled conductance modulator which controls the amplitude and direction of current flow through each of the three windings of a 3 phase torque motor. A common application is the position control of a torque repeater (TR) by a 3 wire synchro signal. At positional null the stator voltages of the controlling synchro agree with the stator voltages of the controlled TR, there is no significant in-phase current flow between the TR stators, and no torque is generated. When the input controlling angle changes; the stator voltages are mismatched and in-phase current flows between the stators of the TR producing torque. The torque moves the TR rotor through the shortest path to positional null. Any inertial overshoot beyond null produces torque in the opposite direction moving the rotor back to null. The power required to energize the invention and to move the torque repeater to null is provided by the torque repeater itself. The load seen by the controlling synchro source is determined by the values of the input isolation resistors. The load seen by a control transmitter (CX) synchro source can be much less than the load presented by a single matching control transformer (CT) synchro. A CX source is therefore capable of controlling the shaft position of many torque repeaters equipped with the conductance modulator invention. Alternatively, as each additional TR provides its own torque power, a single conductance modulator will control the position of a plurality of TR synchros connected in parallel.

The invention has the following objectives:
1. Provide continuous analog position control of torque repeaters using their self torquing properties to arrive at positional null.
2. Provide isolation between TX and TR synchros eliminating the high peak currents flowing between these devices.
3. Permit more accurate use of the TX stator lines by other devices such as control transformers and synchro to digital converters by isolating the TX from the dynamic and static imbalances presented by the TR load.
4. Provide control of multiple high power torque repeaters by a single low power synchro signal source (CX, CD, DS, etc.).
5. Provide a simple, compact, light weight, economical, transformerless, non-frequency sensitive, high input impedance device requiring no external power and capable of positioning multiple torque receivers connected in parallel.

OPERATION

Figure 1:
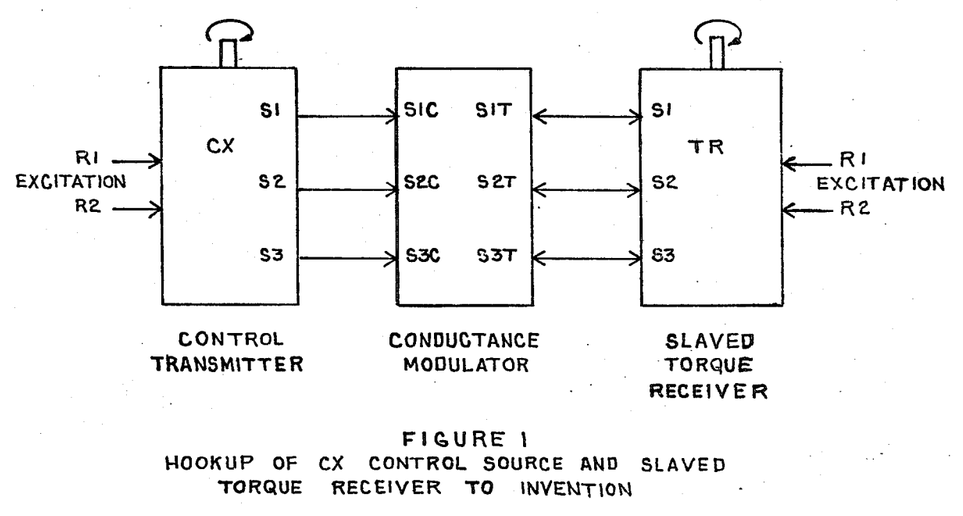
FIG. 1—Hookup of Control Transmitter (CX) signal source and a slaved Torque Receiver (TR) to the invention.
Figure 2:
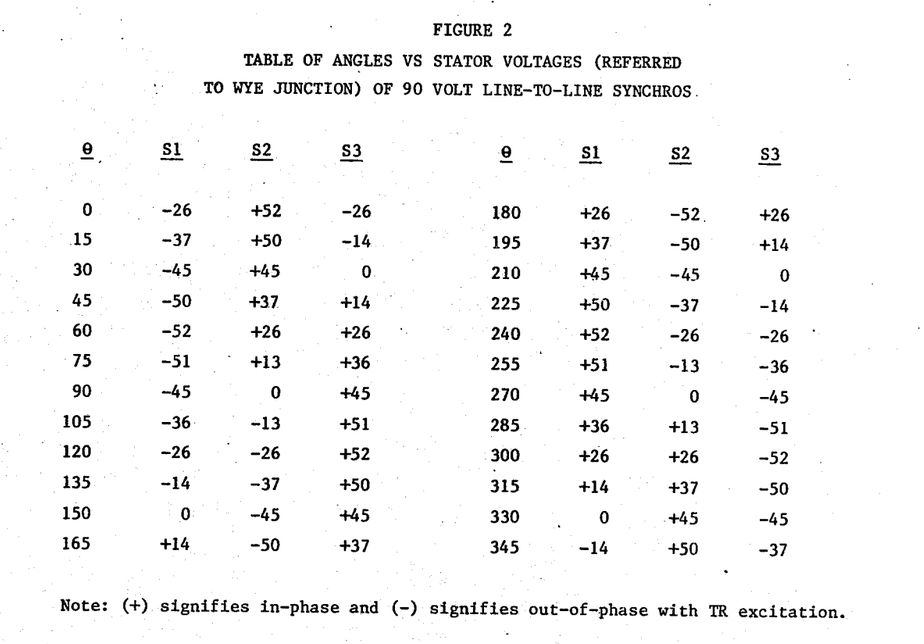
FIG. 2—Table of stator voltages referred to wye junctions at various angles.

Refer to FIGS. 1 and 2. FIG. 1 describes the hookup of a Control Transmitter (CX) signal source and a slaved Torque Receiver (TR) to the conductance modulator. FIG. 2 is a table of stator voltages relative to the wye junction for various angles for a 90 volt rms line to line synchro with 115 Vrms excitation. Note the conjugate relationship of the three stator voltages.

Figure 4:
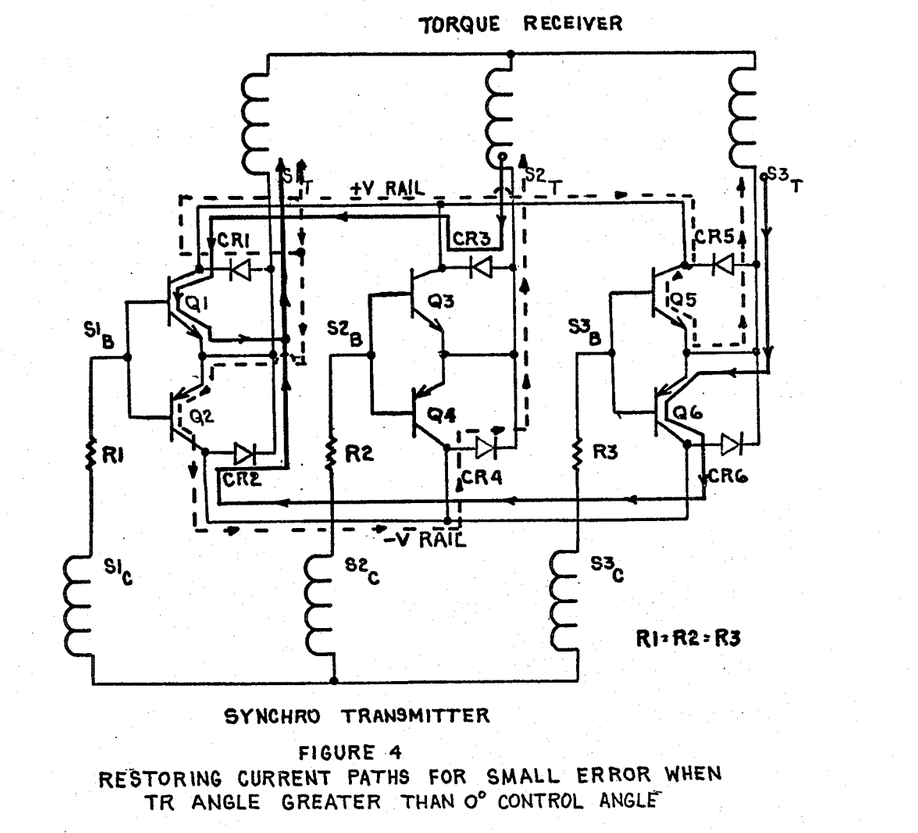
FIG. 4—Schematic diagram defining restoring current paths for error condition when TR angles greater than zero° command angle.
Figure 5:
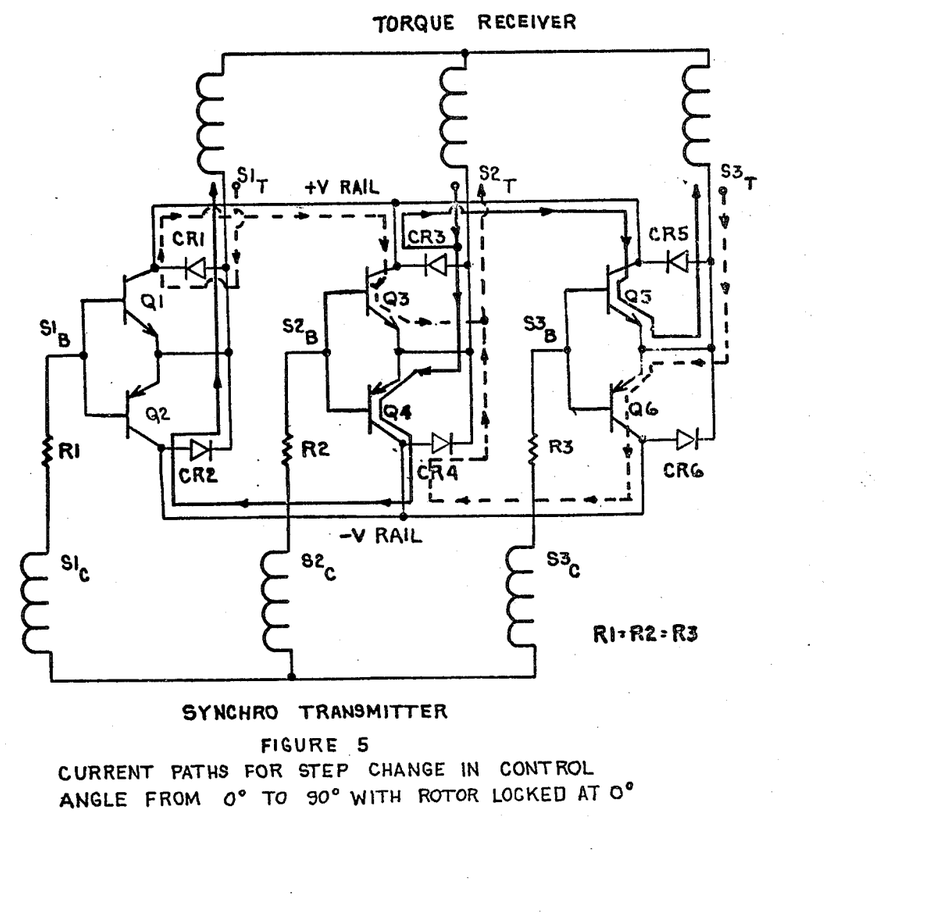
FIG. 5—Schematic diagram defining current paths for a step change in control angle from 0° to 90°.
Figure 6:
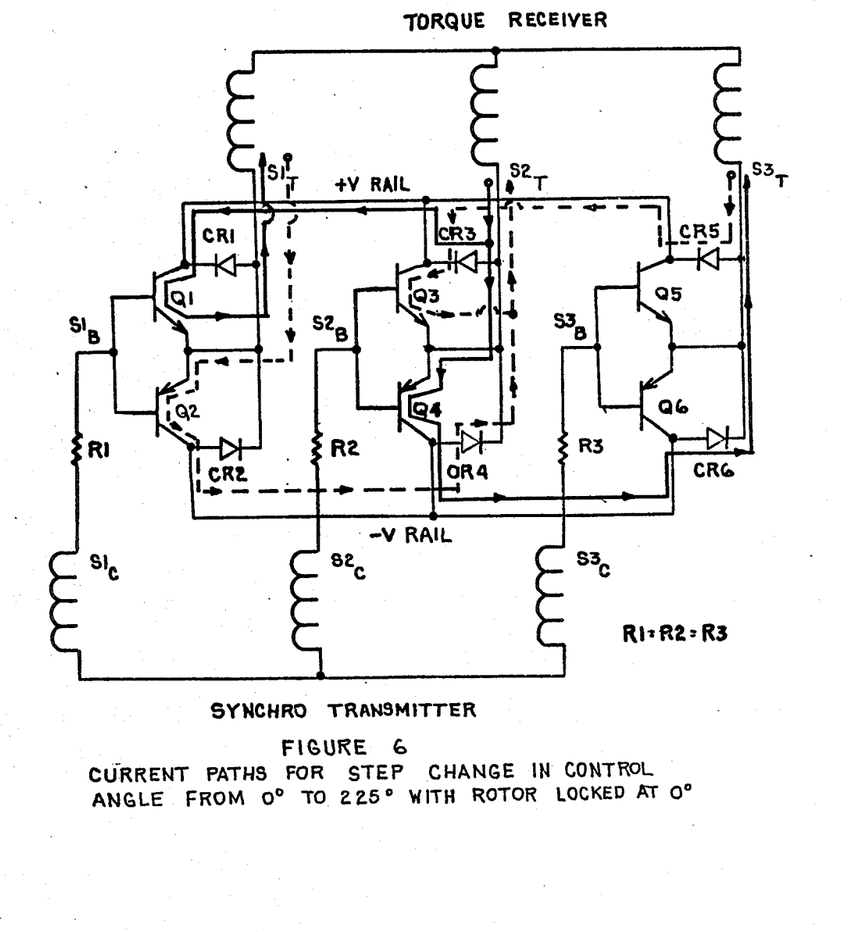
FIG. 6—Schematic diagram defining current paths for a step change in control angle from 0° to 225°.

Refer to the FIG. 4 through 6 schematics. At each angle one of the three TR stators is the source of current and is connected to each of the other "load" stators by a series diode and transistor with one current path via the (+) V Rail and the other via the (−) V Rail. The magnitude of the current in each of these two paths is proportional to the voltage difference between the Control stator and the corresponding TR stator and the sum of these two currents defines the total current from the TR source stator. When the AC excitation voltage changes phase the current paths between the TR source stator and the load stators also change.

Figure 3:
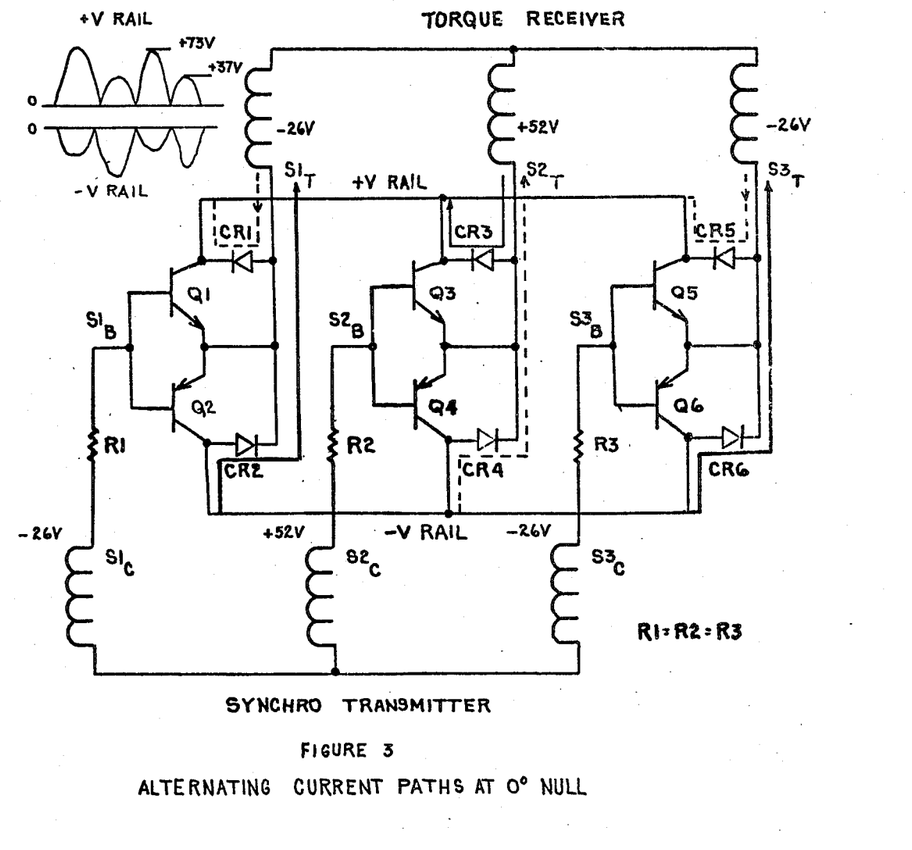
FIG. 3—Schematic diagram defining current paths at a positional null of zero°.

The notations of FIG. 3 describe the zero degree null conditions with both the CX and TR at zero degrees. The solid arrows define current flow through the first half of the excitation waveform and the dashed arrows define current flow through the second half of the excitation waveform. During the first half of the excitation waveform stator S2T is clamped to the (+) rail by CR3 and stators S1T and S3T are clamped to the (−) V rail by CR2 and CR6. S1T and S3T are at the same potential hence no current flows. During the second half of the excitation waveform S2T is clamped to the (−) rail by CR4 and S1T and S3T are clamped to the (+) V rail by CR1 and CR5. At null transistor conduction is limited to small quadrature currents symmetrically bracketing the voltage axis crossings which do not produce any net torque. Any motion of the TR rotor changes the S1 to S3 voltage match with one stator increasing voltage and the other decreasing voltage. FIG. 4 describes the restoring current paths for the error condition when the TR is slightly greater than the command angle of zero degrees.

The following figures describe current paths for various step changes in angle with the TR rotor locked at zero degrees.

FIGS. 5 and 6 describe the current paths established by a step change in control angle from 0 degrees to 90 degrees and 225°, respectively.

Figure 7:
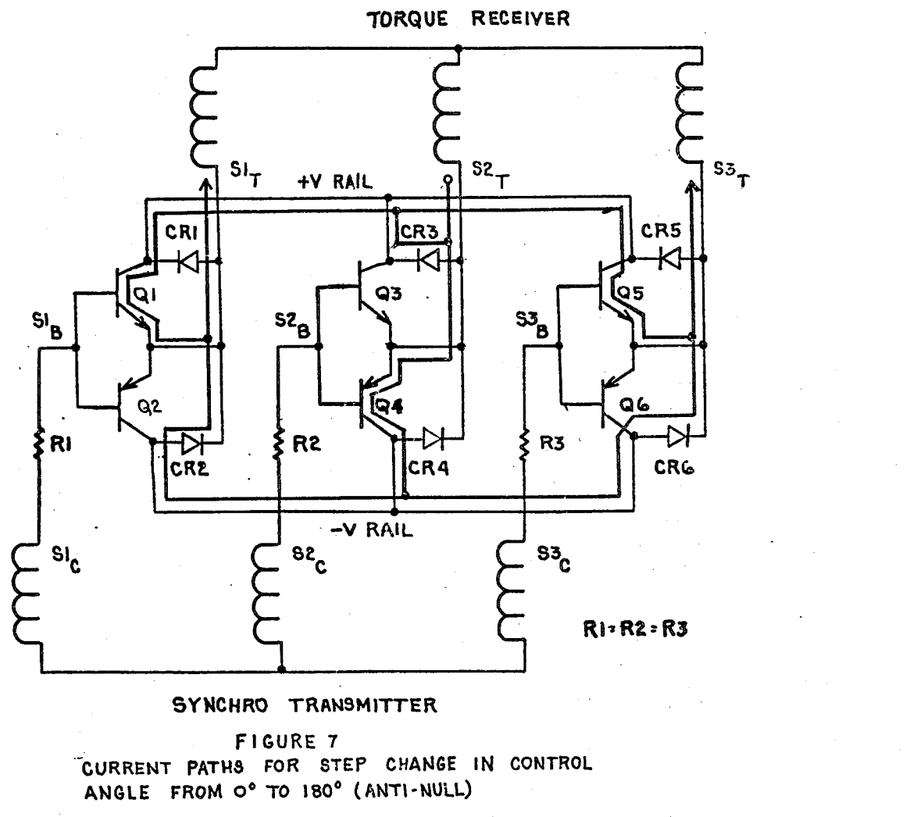
FIG. 7—Schematic diagram defining current paths for a step change in control angle from 0° to 180° (anti-null).

FIG. 7 describes the current paths following a 180 degree step change in angle. Note that all TR stators are connected through a conducting diode or saturated transistor to both the (+) V and (−) V rails, and, therefore, are effectively shorted together and hence no torque is developed. Note that as the (+) V and (−) V rails are effectively shorted together the voltage between these rails drops to approximately zero.

From the foregoing a low power synchro signal controlled conductance modulator has been described which controls the magnitude and direction of current flow between each of the 3 stator windings of a high power torque receiver causing the torque receiver to rotate to the angular position commanded by the controlling synchro signal. Position control is continuous through 360°.

It will now be appreciated that the present invention achieves the previously-recited goals in a simple and direct fashion, and does not simply switch a control power source to drive a torque motor, or vary the duty cycle of a plurality of digital switches, but rather utilizes the phase and amplitude information of the torque motor's stator voltages, selectively amplified in a continuous fashion determined by the controller-receiver error signals, to self power the torque motor to a null position. The circuit advantageously isolates the controlling signals via series resistances.

Specifically, the circuit provides the following:
1. A three phase analog signal-controlled circuit which controls the current-flow through the individual stator windings of one or more 3 phase torque motors producing self-rotation of the torque motor(s) to the angular position defined by the controlling signals.
2. In normal operation, the circuit develops a full-wave rectified DC voltage.
3. This DC voltage drops to substantially zero volts at false nulls, and therefore the presence of this voltage identifies normal operation and its absence identifies the false null condition.
4. The circuit provides substantial isolation between the controlling torque transmitter and the controlled torque motor, thus eliminating the high current surges which normally flow between these devices, and substantially improving the angular accuracy of the torque transmitter stator output lines.
5. The circuit converts the interactive low impedance load presented by the torque motor to the controlling source, to a relatively high impedance substantially balanced load capable of being driven by low power control transmitters and conventional low power digital to synchro converters.
6. The circuit can derive its own operating power from the torque receiver, does not require operating power from external AC or DC power sources, and does not require reference phase or any other form of externally supplied intelligence other than the intelligence inherent in the conjugate relationships of the 3 phase analogue input control signals.

Specifically, it can be seen by referring to any of the schematic diagrams of FIGS. 1, 2-7, that each of the three stators of the torque receiver is connected to the V(+) rail through a diode, and to the V(−) rail through another, oppositely oriented diode. With this arrangement, at a given instant in time, the signal with the highest positive voltage will pass through the diode to the V(+) rail, and the signal with the lowest negative voltage will pass through its corresponding diode to the V(−) rail, and all other intermediate voltage stator signals will not flow past either of their respective stator's diodes.

This "power supply" thus connects (via a diode) the high (+) potential stator to the collector of each NPN transistor. and the largest amplitude (−) potential stator to the collector of each PNP transistor.

It may also be seen that viewing any pair of stator receiver windings and their 4 diodes in isolation, the 4 diodes comprise a full-wave bridge rectifier, with the voltage developed across the two wye-connected stator windings as an input, and the V(+) and V(−) rails as output terminals.

Because the torque receiver stator signal and the corresponding control signal are impressed on the base and emitter of each stator's transistor pair, each transistor pair inherently functions as a comparator, the output of which depends on the relative voltage of its control and receiver stator signals, so that the power supply current will flow to the emitter only when the control signal and the receiver stator signal are non-identical, i.e., when the receiver is misaligned. Thus each stator's position error signal controls the amount of current flow to the stator.

Moreover, since the diode array operates to lock the high stator to the power supply rails, the high stator at a given time is directly connected to the rail (hence the collector of its own transistors) and to the emitter (of its own transistors), as appears in the schematic diagram, so that its current flows, via the rail, only to the other two stators. That is, its own transistor pair will have no voltage differential across its collector/emitter path, hence no current flow, when that stator is high. Thus, the diode array connected to the collector current paths of the transistors inherently operates as a driver arrangement to both connect the highest amplitude receiver stator winding to the other two stator windings, and cause the current flow to those windings to be a function of the difference in the voltages in the corresponding controller and receiver stator windings.

It is believed that the use of a comparator and driver arrangement in conjunction with a power supply in which the power supply potential is derived from the torque receiver stator voltages is a unique feature not indicated in the art. The use of such a power supply dispenses with the need for a "sectant detector" or the need for duty-cycle switching of the synchro-stator lines to achieve non-node angular positions, and achieves self-torquing using the simple network of the present comparator and driver means.

A basic conductance modulator powered by the slaved torque receiver(s) has been described, however it is not intended that the invention be restricted thereto, but that it be limited only by the true spirit and scope of the claims. It is anticipated that normal modifications, refinements, and details by those skilled in the art may require the use of external DC or AC power. It is intended to embrace any such modifications within the scope of the following claims.

What is claimed is:

1. A device for self-torquing a torque receiver having stator windings to a null position with respect to a three-phase input signal representative of the position of a control transmitter, such device comprising:
   a power source, derived from the stator signals of the torque receiver, having a high potential and a low potential terminal;
   a comparator means, connected to the three-phase input signal and to the torque receiver stator windings, for comparing the voltage on each stator winding with the corresponding input signal of the control transmitter; and
   a driver means, in communication with the power source and with the comparator means, for selectively connecting, at a given instant, the torque receiver stator winding having the greatest output voltage amplitude, to the other two stator windings for driving said torque receiver to a null position.

2. A device according to claim 1, wherein the power source comprises first and second rectifiers for each stator winding of the torque receiver, each stator winding being connected to the anode of its first rectifier, and to the cathode of its second rectifier, the cathodes of all three first rectifiers being connected to a first common bus and the anodes of all three second rectifiers being connected to a second bus, so that there is developed across said first and second busses a voltage derived from the stator outputs for powering the comparator and driver means.

3. A device according to claim 2, wherein the only current paths between the two common busses either include a series pair of diodes of opposing orientation, or include collector-emitter current paths of transistors on the base and emitter of which are impressed corresponding control and torque receiver stator signals, so that when the control and torque receiver signals are equal, no current flows between the two busses.

4. A device according to claim 2, wherein the comparing means includes for each stator winding, a transistor having the stator voltage signal of the torque receiver applied to its emitter and the corresponding control signal applied to its base, so that a difference in the two signals is operative to permit current to flow between the collector and the emitter of the transistor.

5. A device according to claim 1, wherein the comparing means includes a transistor for each stator winding, the transistor having the stator voltage signal of the torque receiver applied to its emitter and the corresponding control signal applied to its base, so that a difference in the two signals is operative to permit current to flow between the collector and the emitter.

6. A device according to claim 5, wherein the comparing means further includes, for each stator winding of the torque receiver, a second transistor of polarity (e.g. NPN or PNP) opposite to that of the first transistor, the stator voltage signal being applied to both emitters and the corresponding control signal being applied to both bases, wherein the high potential terminal of the power source is connected to the collector of the NPN transistor, and the low potential terminal of the power source is connected to the collector of the PNP transistor, so that when the base voltage is higher or lower than the emitter voltage, current is permitted to flow respectively from the higher or lower potential terminal of the power source to the stator winding for causing rotation of the torque receiver.

7. A device according to claim 6, wherein the presence of an anti-null condition causes saturation of the transistor pair of at least one torque receiver stator, for interconnecting the two busses and causing the power source potential to drop to substantially zero volts, so that the zero voltage condition is indicative of the occurrence of such anti-null position of the torque receiver.

8. A device for self-torquing a torque receiver having 3 stator windings to a null position with respect to a 3 phase control signal each phase of the control signal being representative of the position of a stator winding of a control transmitter, such device comprising:
   means for selectively interconnecting, at each instant in time, that stator winding of the torque receiver having the highest voltage amplitude, to each of the other two windings; and
   driver means for causing the current flow to each other winding to be a function of the instantaneous difference between the voltage developed across such other winding and the voltage of the phase of the control signal corresponding to such other winding.

9. A device according to claim 8, wherein the driver means includes, for each stator winding, a first transistor having the stator voltage applied to its emitter and the phase of the control signal voltage corresponding to that stator applied to its base.

10. A device according to claim 9, wherein the transistor connected to each stator is part of a bipolar transistor pair also including a second transistor of opposite (NPN or PNP) type having its base and emitter terminals connected to the base and emitter terminals of the first transistor, for regulating current flow to each such other winding when the voltage difference between the stator winding and the corresponding control signal is either positive or negative.

11. A device according to claim 8, wherein the means for selectively interconnecting the stator winding having the highest amplitude to each of the other two windings includes a 3-phase full wave rectifier bridge, having as inputs the three signals developed between the two output terminals of the three combinations of two stator windings of a wye connected torque receiver.

12. A device according to claim 11, wherein the driver means includes an amplifier, the input of which is connected to the rectifier output and the output of which is connected to the torque receiver stator windings.

13. A device according to claim 12, wherein the driver means includes means operative to interconnect the rectifier output terminals to each other along a maximally conductive path when the torque receiver stator is in an anti-null position with respect to the 3 phase control signal, thereby dropping the rectifier output to substantially zero.

* * * * *